(12) United States Patent
Feng (10) Patent No.: US 10,963,113 B2
(45) Date of Patent: Mar. 30, 2021

(54) TOUCH PANEL AND FABRICATION METHOD THEREOF

(71) Applicant: Wuhan China Star Optoelectronics Semiconductor Display Technology Co., Ltd., Wuhan (CN)

(72) Inventor: Xiaoliang Feng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 22 days.

(21) Appl. No.: 16/349,632

(22) PCT Filed: Feb. 25, 2019

(86) PCT No.: PCT/CN2019/076004
§ 371 (c)(1),
(2) Date: May 14, 2019

(87) PCT Pub. No.: WO2020/118904
PCT Pub. Date: Jun. 18, 2020

(65) Prior Publication Data
US 2020/0301543 A1    Sep. 24, 2020

(30) Foreign Application Priority Data
Dec. 11, 2018    (CN) .......................... 201811509337.X (51) Int. Cl.
*G06F 3/044* (2006.01)

(52) U.S. Cl.
CPC .. *G06F 3/0445* (2019.05); *G06F 2203/04102* (2013.01); *G06F 2203/04103* (2013.01)

(58) Field of Classification Search
CPC ............... G06F 3/0445; G06F 3/044; G06F 2203/04103; G02F 1/13338; B32B 2255/04; B32B 2260/025; B32B 5/16
See application file for complete search history.

(56) References Cited

U.S. PATENT DOCUMENTS

| 9,557,859 | B2 * | 1/2017 | Bright | G06F 3/0445 |
| 9,569,020 | B2 * | 2/2017 | Park | G06F 3/041 |
| 9,817,529 | B2 * | 11/2017 | Bae | G06F 3/044 |
| 10,649,590 | B2 * | 5/2020 | Toyooka | G03F 7/168 |
| 2017/0199597 | A1 * | 7/2017 | Son | G06F 3/044 |
| 2018/0260053 | A1 * | 9/2018 | Hong | G06F 3/0443 |
| 2019/0187846 | A1 | 6/2019 | Du et al. | |

FOREIGN PATENT DOCUMENTS

| CN | 103399680 | 11/2013 |
| CN | 104216587 | 12/2014 |
| CN | 106433398 | 2/2017 |
| CN | 107871822 | 4/2018 |
| CN | 108008862 | 5/2018 |
| JP | 2011-027952 | 2/2011 |

* cited by examiner

*Primary Examiner* — Sardis F Azongha (57) ABSTRACT

A touch panel and a fabrication method thereof are provided. The touch panel includes a plurality of touch electrodes and at least one organic, transparent, electrically conductive layer. The touch electrodes include a plurality of touch units. The at least one organic, transparent, electrically conductive layer covers at least one surface of the touch units. Therefore, the touch electrodes of the touch panel have good electrical conductivity and flexibility.

17 Claims, 6 Drawing Sheets

TOUCH PANEL AND FABRICATION METHOD THEREOF

RELATED APPLICATIONS

This application is a National Phase of PCT Patent Application No. PCT/CN2019/076004 having International filing date of Feb. 25, 2019, which claims the benefit of priority of Chinese Patent Application No. 201811509337.X filed on Dec. 11, 2018. The contents of the above applications are all incorporated by reference as if fully set forth herein in their entirety.

FIELD AND BACKGROUND OF THE INVENTION

The present disclosure relates to a field of touch technologies, and more particularly to a touch panel and a fabrication method thereof.

With advent of flexible screen products, display devices and touch devices of display screens have gradually developed in a direction that display devices and touch devices have flexibility. In order for display devices to meet flexible characteristic requirements, metal mesh structures are selected for touch electrodes. Metal mesh structures have flexibility and electrical conductivity that meet requirements of flexible screens. However, due to opacity of metal, when metal meshes are made, metal lines need to be disposed in a non-active area, or need to be made very fine. These two methods impose very high requirements on processes and equipment, causing equipment investments to be huge, indirectly resulting in increase in product costs. Indium tin oxides (ITOs) are a common choice for touch electrodes of flexible screens. A problem of using ITOs for touch electrodes is that ITOs have large brittleness, and therefore, ITO electrodes cannot meet flexibility requirements of flexible screens for touch electrodes.

SUMMARY OF THE INVENTION

Problems of the present disclosure are as follows. An object of the present disclosure is to provide a touch panel and a fabrication method thereof. Touch electrodes of the touch panel have electrical conductivity and flexibility that meet flexibility requirements of flexible screens for touch electrodes.

Technical solutions of the present disclosure are as follows. A touch panel includes:
a plurality of touch electrodes including a plurality of touch units; and
at least one organic, transparent, electrically conductive layer;
wherein the at least one organic, transparent, electrically conductive layer covers at least one surface of the touch units.

In the aforementioned touch panel, each of the touch units includes a transmitting electrode and a receiving electrode.

In the aforementioned touch panel, there are a plurality of the organic, transparent, electrically conductive layers; the organic, transparent, electrically conductive layers include at least one first organic, transparent, electrically conductive layer and at least one second organic, transparent, electrically conductive layer; and the at least one first organic, transparent, electrically conductive layer covers at least one surface of the transmitting electrode, and the at least one second organic, transparent, electrically conductive layer covers at least one surface of the receiving electrode.

In the aforementioned touch panel, there is only one of the first organic, transparent, electrically conductive layer, there is only one of the surface of the transmitting electrode, and there is only one of the surface of the second organic, transparent, electrically conductive layer; the first organic, transparent, electrically conductive layer electrically conductive layer covers the surface of the transmitting electrode; and the second organic, transparent, electrically conductive layer covers the surface of the receiving electrode.

In the aforementioned touch panel, each of the touch units is a self-capacitive touch electrode.

In the aforementioned touch panel, there are a plurality of the organic, transparent, electrically conductive layers; and the organic, transparent, electrically conductive layers correspondingly cover two opposite surfaces of the self-capacitive touch electrode.

In the aforementioned touch panel, each of the at least one organic, transparent, electrically conductive layer has a thickness of 0.1 μm to 2 μm.

In the aforementioned touch panel, a fabrication material of each of the touch units is indium tin oxide (ITO).

In the aforementioned touch panel, a fabrication material of each of the touch units is metal.

In the aforementioned touch panel, each of the at least one organic, transparent, electrically conductive layer is an organic, transparent, electrically conductive adhesive.

A fabrication method of a touch panel, including:
providing a substrate;
disposing a plurality of touch units on the substrate; and
covering at least one surface of the touch units with at least one organic, transparent, electrically conductive layer.

In the aforementioned fabrication method of the touch panel, each of the touch units is any of two-layer mutual-capacitive electrodes, a single-layer self-capacitive touch electrode, and single-layer mutual-capacitive electrodes.

In the aforementioned fabrication method of the touch panel, a fabrication material of each of the touch units is indium tin oxide (ITO).

In the aforementioned fabrication method of the touch panel, a fabrication material of each of the touch units is metal.

In the aforementioned fabrication method of the touch panel, each of the at least one organic, transparent, electrically conductive layer has a thickness of 0.1 μm to 2 μm.

In the aforementioned fabrication method of the touch panel, each of the at least one organic, transparent, electrically conductive layer is an organic, transparent, electrically conductive adhesive.

In the aforementioned fabrication method of the touch panel, the substrate is a rigid substrate or a flexible substrate.

In the aforementioned fabrication method of the touch panel, the flexible substrate is any of a polyimide (PI) substrate, a cycloolefin polymer (COP) substrate, a polyethylene terephthalate (PET) substrate, and a flexible organic light-emitting diode (OLED) display.

In the aforementioned fabrication method of the touch panel, the rigid substrate is any of a glass substrate, a thin film transistor array substrate, a liquid crystal panel, and a rigid OLED display.

Advantages of a touch panel and a fabrication method thereof are as follows. The at least one organic, transparent, electrically conductive layer covers at least one surface of the touch units. Therefore, the touch electrodes of the touch panel have good electrical conductivity and flexibility.

DESCRIPTION OF SPECIFIC-EMBODIMENTS OF THE INVENTION

Technical solutions in the embodiments of the present disclosure are clearly and completely described below in conjunction with the drawings in the embodiments of the present disclosure. Obviously, the described embodiments are only a portion of the embodiments of the present disclosure, not all of the embodiments. Based on the embodiments of the present disclosure, other embodiments obtained under a premise that inventive efforts are not made by persons of ordinary skill in the art are within the protection scope of the present disclosure.

The present disclosure provides a touch panel, including:
a plurality of touch electrodes including a plurality of touch units; and
at least one organic, transparent, electrically conductive layer;
wherein the at least one organic, transparent, electrically conductive layer covers at least one surface of the touch units.

The touch electrodes have good electrical conductivity. The at least one organic, transparent, electrically conductive layer has good flexibility. The at least one organic, transparent, electrically conductive layer covers the at least one surface of the touch units. Therefore, the touch electrodes of the touch panel have good electrical conductivity and flexibility, meeting flexibility requirements of a flexible screen for the touch electrodes.

FIGS. 1A-1H are schematic diagrams illustrating structures during a fabrication process of a touch panel in accordance with a first embodiment of the present disclosure. The fabrication process includes the following steps.

S10: A substrate 11 is provided.

In the present embodiment, the substrate 11 may be a flexible substrate, or may be a rigid substrate. The flexible substrate includes, but is not limited to, any of a polyimide (PI) substrate, a cycloolefin polymer (COP) substrate, a polyethylene terephthalate (PET) substrate, and a flexible organic light-emitting diode (OLED) display. The rigid substrate includes, but is not limited to, any of a glass substrate, a thin film transistor array substrate, a liquid crystal panel, and a rigid OLED display.

Figure 1A:
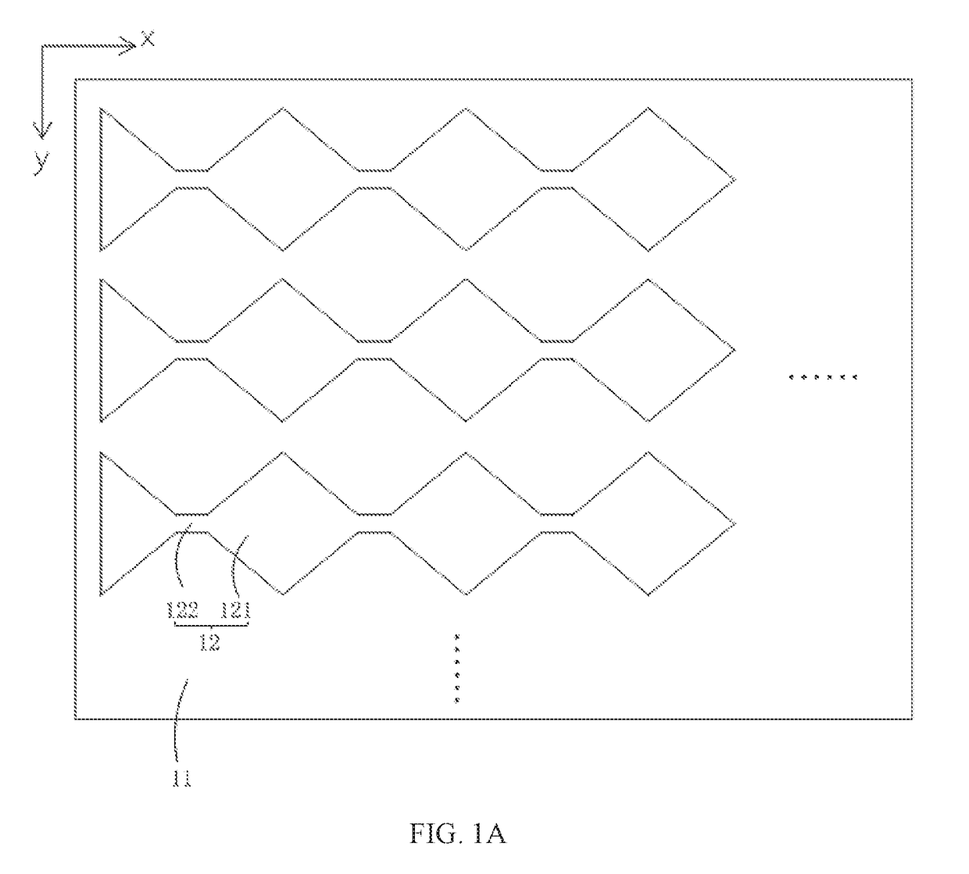
FIGS. 1A, 1B, 1C, 1D, 1E, 1F, 1G and 1H are schematic diagrams illustrating structures during a fabrication process of a touch panel in accordance with a first embodiment of the present disclosure.

S11: As illustrated in FIG. 1A, a patterned first organic, transparent, electrically conductive layer 12 is formed on the substrate 11. The patterned first organic, transparent, electrically conductive layer 12 includes a plurality of rhombuses 121 arranged in an array along x and y directions, and a plurality of bridge lines 122 each of which connects two adjacent rhombuses 121 in a same corresponding row. The bridge lines 122 are arranged in an array along the x direction.

Specifically, the patterned first organic, transparent, electrically conductive layer 12 may be formed using an inkjet printing process, a screen printing process, or a yellow light process.

In the present embodiment, the patterned first organic, transparent, electrically conductive layer 12 is an organic, transparent, electrically conductive adhesive. The patterned first organic, transparent, electrically conductive layer 12 has a thickness of 0.1 µm to 2 µm. In order to illustrate a technical solution of the present disclosure, the patterned first organic, transparent, electrically conductive layer 12 includes a plurality of rhombuses 121 arranged in an array along x and y directions, and a plurality of bridge lines 122 each of which connects two adjacent rhombuses 121 in a same corresponding row. By using corresponding bridge lines 122 to connect each two adjacent rhombuses 121 in a same row, a row of rhombuses connected in series is formed. One end of each row of rhombuses connected in series is a triangular-shaped electrode. In other embodiments, the patterned first organic, transparent, electrically conductive layer 12 may also have a square shape, a strip shape, a circular shape, or other shapes. The present disclosure does not specifically limit the shape of the patterned first organic, transparent, electrically conductive layer 12.

The organic, transparent, electrically conductive adhesive is a mixture of an organic adhesive and electrically conductive nano particles. Therefore, the patterned first organic, transparent, electrically conductive layer 12 has electrical conductivity, adhesion, and flexibility. Although the organic, transparent, electrically conductive adhesive has electrical conductivity and good flexibility, the organic, transparent, electrically conductive adhesive has the organic adhesive, causing the organic, transparent, electrically conductive adhesive to have high resistivity and to be unable to meet an electrical conductivity requirement for the touch electrodes. Therefore, the organic, transparent, electrically conductive adhesive cannot serve as any of the touch electrodes directly.

Figure 1B:
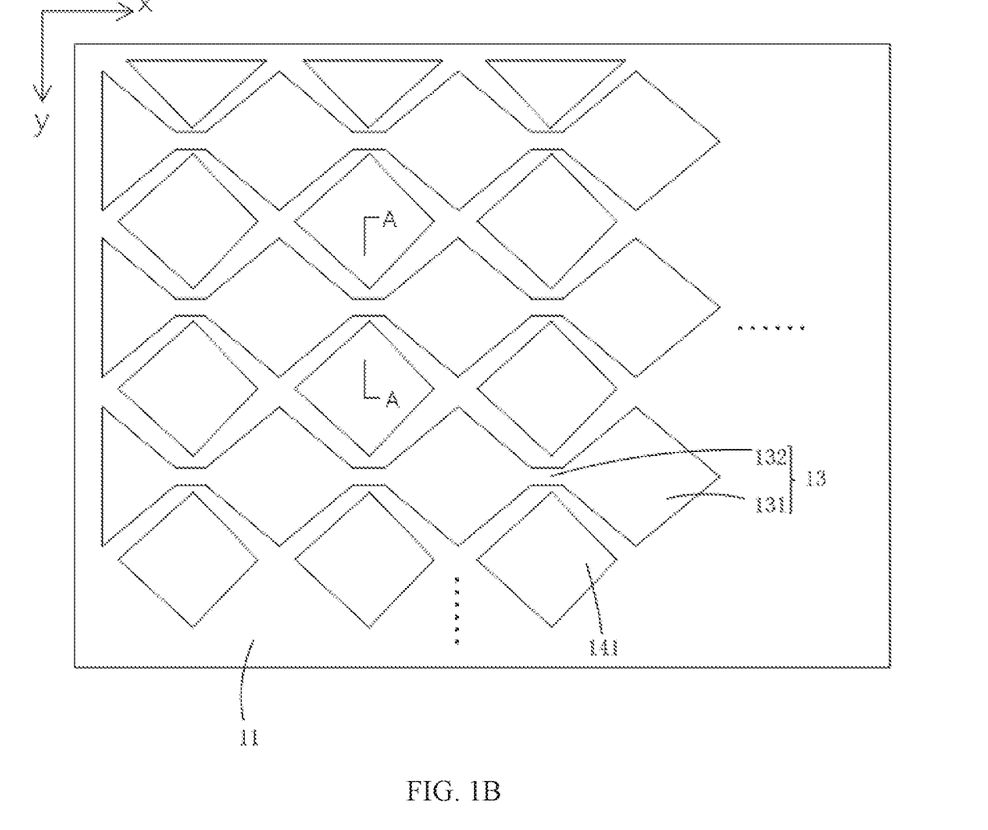
Figure 1C:
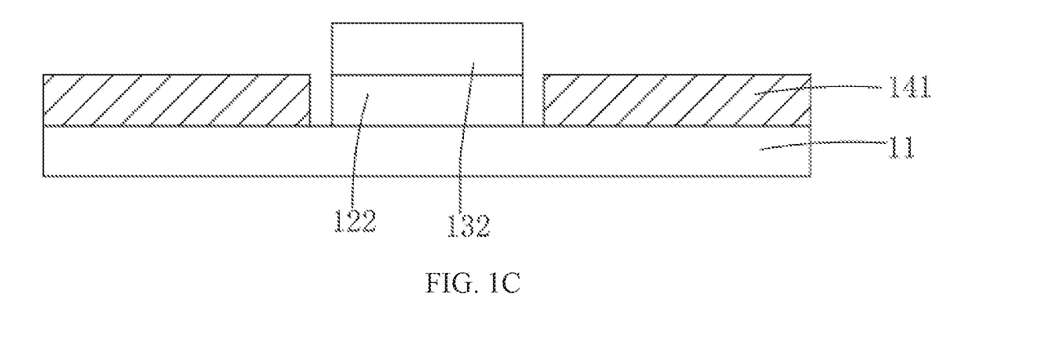

S12: While a plurality of first electrodes 131 and a plurality of first bridge lines 132 are formed on the patterned first organic, transparent, electrically conductive layer 12, a plurality of second electrodes 141 are formed on a region of the substrate 11 not covered by the patterned first organic, transparent, electrically conductive layer 12. The patterned first organic, transparent, electrically conductive layer 12 covers the first electrodes 131 and the first bridge lines 132.

Specifically, as illustrated in FIGS. 1B and 1C, FIG. 1C is a cross-sectional diagram taken along line A-A in FIG. 1B. A plurality of electrode layers completing a surface overlapped by the electrode layers are formed on the patterned first organic, transparent, electrically conductive layer 12 and the substrate 11. While the first electrodes 131 and the first bridge lines 132 are formed on the patterned first organic, transparent, electrically conductive layer 12, the second electrodes 141 are formed on the region of the substrate 11 not covered by the patterned first organic, transparent, electrically conductive layer 12 using a yellow light process. That is, the first electrodes 131 and the second electrodes 141 are formed using the same process. In the present embodiment, the electrode layers are formed using vacuum sputtering deposition. A fabrication material of each of the electrode layers is indium tin oxide (ITO). It can be appreciated that the fabrication material of each of the electrode layers is not limited to ITO, and may also be another brittle material or a material which may be easily broken after the material is bent a plurality of times, such as a metal material.

In the present embodiment, the patterned first organic, transparent, electrically conductive layer 12 covers the first electrodes 131 and the first bridge lines 132, causing the first electrodes 131 and the first bridge lines 132 to have good electrical conductivity and flexibility. The first electrodes 131 are located on a surface of the rhombuses 121, and the two have exactly a same size. The first bridge lines 132 are located on a surface of the bridge lines 122, and the two have exactly a same size. That is, the first electrodes 131 are a plurality of rhombic electrodes arranged in an array along x and y directions. In the x direction, each two adjacent first electrodes 131 in a same row are connected by a corresponding first bridge line 132. Each of the first electrodes 131 may be a receiving electrode, or may be a transmitting electrode.

The second electrodes 141 are formed on a region of the substrate 11 not covered by the patterned first organic, transparent, electrically conductive layer 12. The second electrodes 141 are a plurality of rhombic electrodes arranged in an array along x and y directions. When each of the first electrodes 131 is a receiving electrode, each of the second electrodes 141 is a transmitting electrode. When each of the first electrodes 131 is a transmitting electrode, each of the second electrodes 141 is a receiving electrode.

Figure 1D:
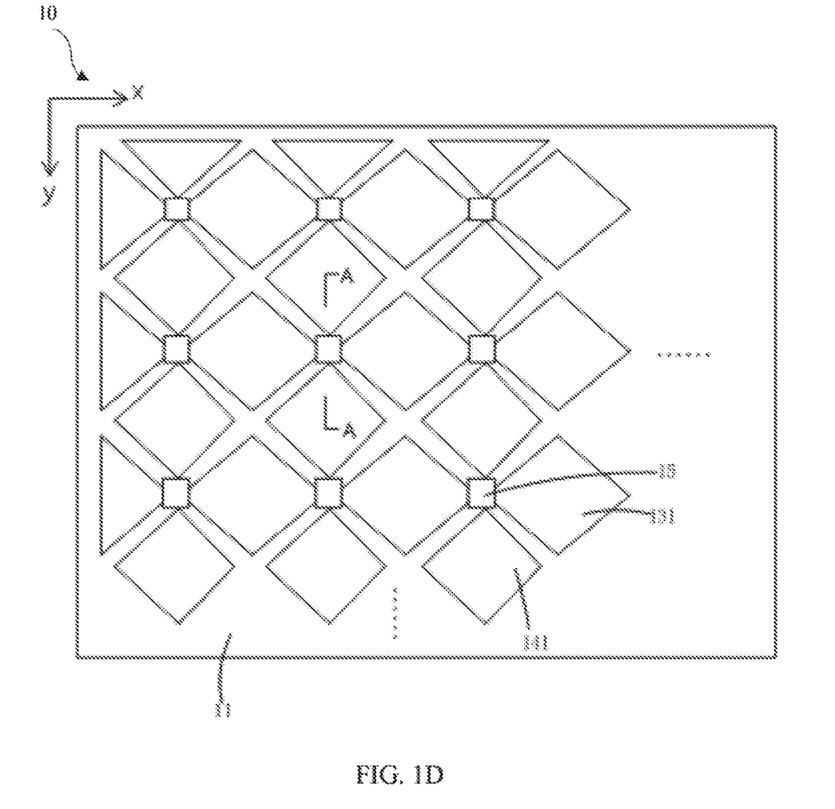
Figure 1E:
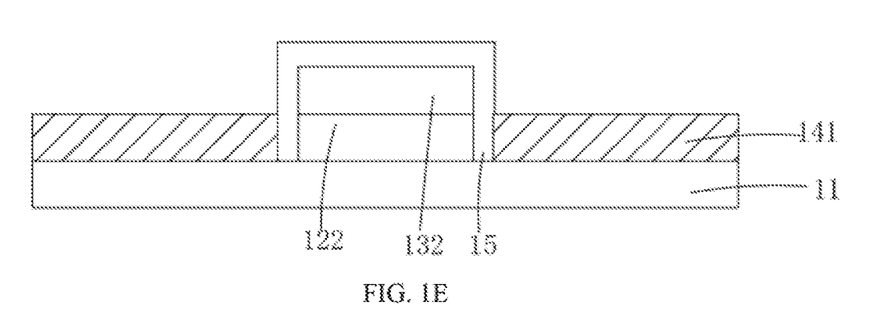

S13: As illustrated in FIGS. 1D and 1E, FIG. 1E is a cross-sectional diagram taken along line A-A in FIG. 1D. A patterned insulating layer 15 is formed on each of the first bridge lines 132, and in a space between each of the second electrodes 141 and the corresponding first bridge line 132.

Specifically, an insulating layer completing a surface overlapped by the insulating layer and covering the first electrodes 131 and the second electrodes 141 are formed. The insulating layer completing the surface overlapped by the insulating layer is then patterned by a yellow light process, to form the patterned insulating layer 15.

The patterned insulating layer 15 is formed to cause the first electrodes 131 and the second electrodes 141 insulated from each other. The patterned insulating layer 15 may be an organic insulating layer, or may also be an inorganic insulating layer. When the patterned insulating layer 15 is the inorganic insulating layer, the inorganic insulating layer is formed using any of plasma enhanced chemical vapor deposition (PECVD), chemical vapor deposition (CVD), and atomic layer deposition (ALD). A fabrication material of the inorganic insulating layer includes, but is not limited to, silicon nitride, silicon oxide, or silicon oxynitride. When the patterned insulating layer 15 is the organic insulating layer, the organic insulating layer is formed using any of inkjet printing and spin coating. A fabrication material of the organic insulating layer includes, but is not limited to, polymethyl methacrylate.

Figure 1F:
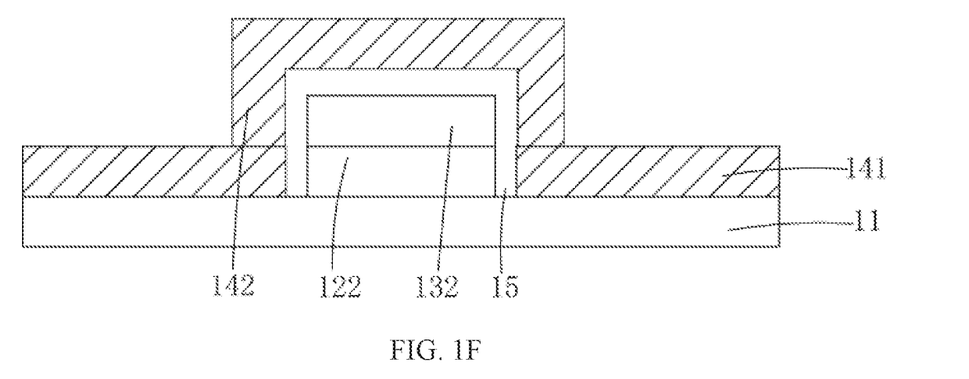

S14: As illustrated in FIG. 1F, which is a cross-sectional diagram taken along line A-A. A plurality of second bridge lines 142 are formed on the patterned insulating layer 15 and the second electrodes 141. In the y direction, each two adjacent second electrodes 141 in a same column are connected by a corresponding second bridge line 142.

By using corresponding second bridge lines 142 to connect each two adjacent second electrodes 141 in a same column in they direction, each of a plurality of columns of electrodes connected in series is formed. One end of each column of electrodes connected in series is a triangular-shaped electrode. The second bridge lines 142 are obtained by using sputtering deposition to form an ITO film, and then using a yellow light process to pattern the ITO film.

Figure 1G:
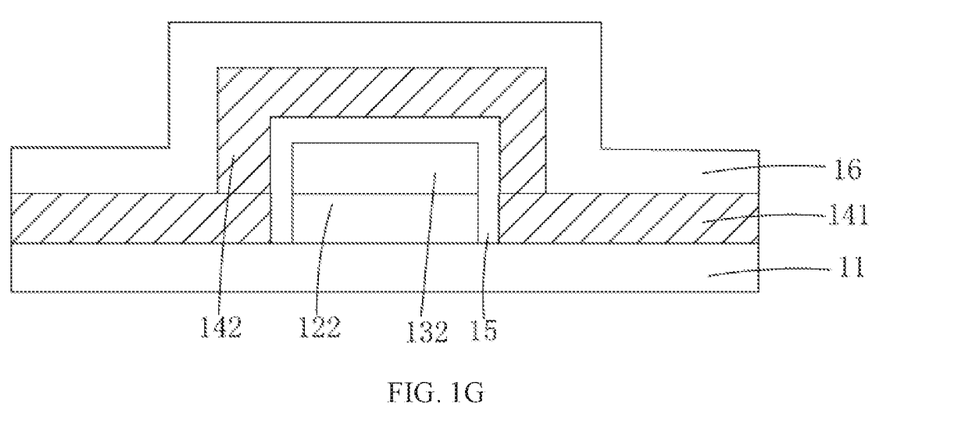

S15: As illustrated in FIG. 1G, which is a cross-sectional diagram taken along line A-A. A patterned second organic, transparent, electrically conductive layer 16 is formed on the second electrodes 141 and the second bridge lines 142. The patterned second organic, transparent, electrically conductive layer 16 covers the second electrodes 141 and the second bridge lines 142.

The patterned second organic, transparent, electrically conductive layer 16 covers the second electrodes 141 and the second bridge lines 142, causing the second electrodes 141 and the second bridge lines 142 to have good electrical conductivity and flexibility. The patterned second organic, transparent, electrically conductive layer 16 covering the second electrodes 141 has a same shape and a same size as the second electrodes 141. The patterned second organic, transparent, electrically conductive layer 16 covering the second bridge lines 142 has a same shape and a same size as the second bridge lines 142.

The patterned second organic, transparent, electrically conductive layer 16 is an organic, transparent, electrically conductive adhesive. The organic, transparent, electrically conductive adhesive is a mixture of an organic adhesive and electrically conductive nano particles. The electrically conductive nano particles include, but are not limited to, nano silver or nano titanium. The organic adhesive includes, but is not limited to, silicone. The patterned second organic, transparent, electrically conductive layer 16 has a thickness of 0.1 μm to 2 μm.

Figure 1H:
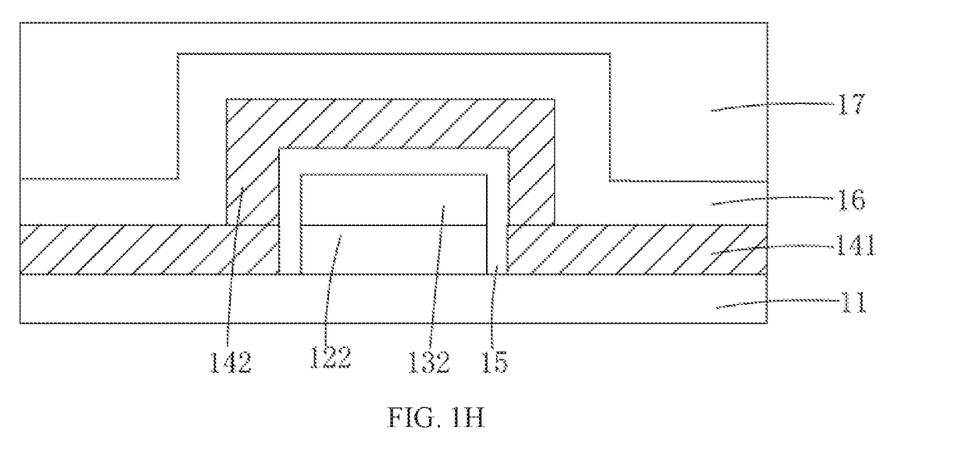

S16: As illustrated in FIG. 1H, which is a cross-sectional diagram taken along line A-A. A protection layer 17 is formed on surfaces of the patterned second organic, transparent, electrically conductive layer 16 and the first electrodes 131.

In the present embodiment, any of the first electrodes 131 connected by a corresponding first bridge line 132, and a corresponding second electrode 141 connected by a corresponding second bridge line 142 form a touch unit. Each of a plurality of touch units forms two-layer mutual-capacitive electrodes. A lower surface of the first bridge lines 132 and the first electrodes 131 are covered by the patterned first organic, transparent, electrically conductive layer 12, and an upper surface of the second bridge lines 142 and the second electrodes 141 are covered by the patterned second organic, transparent, electrically conductive layer 16. Therefore, when the two-layer mutual-capacitive electrodes in accordance with the present embodiment is applied to a flexible screen so that the two-layer mutual-capacitive electrodes are bent, and bending degree is large such that cracks are formed in the two-layer mutual-capacitive electrodes, the organic, transparent, electrically conductive layers connect two ends of each crack, causing the two ends of each crack to be electrically connected to each other. Hence, an electrical conductivity failure of the two-layer mutual-capacitive electrodes caused by the cracks in the two-layer mutual-capacitive electrodes may be prevented. When the flexible screen is unfolded, because the organic, transparent, electrically conductive layers have flexibility and adhesion, locations separated by each crack in the two-layer mutual-capacitive electrodes are in contact with each other. Electrical conductivity of the two-layer mutual-capacitive electrodes is maintained. Thus, covering the at least one surface of touch units with the at least one organic, transparent, electrically conductive layer may cause the touch electrodes to have good electrical conductivity and flexibility that meet performance requirements of the flexible screen for the touch electrodes of the touch panel.

Figure 2:
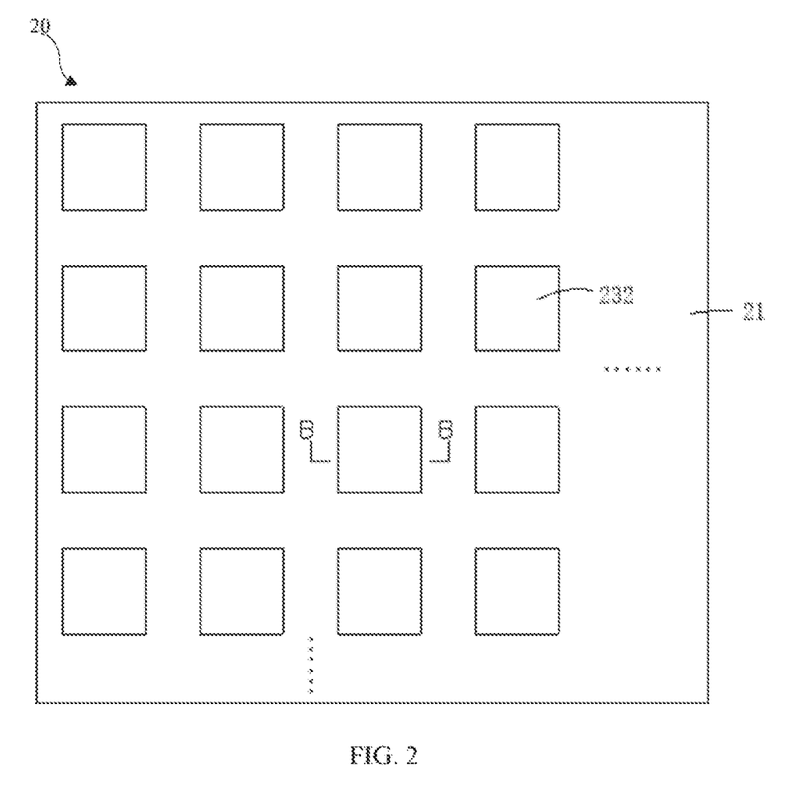
FIG. 2 is a top-view diagram of a touch panel in accordance with a second embodiment of the present disclosure.
Figure 3:
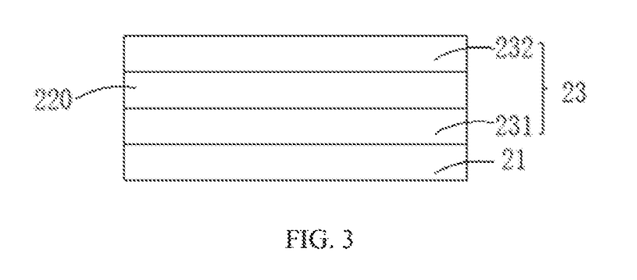
FIG. 3 is a cross-sectional diagram of the touch panel in accordance with the second embodiment of the present disclosure in FIG. 2 taken along a direction B-B.

Referring to FIGS. 2 and 3, FIG. 2 is a top-view diagram of a touch panel 20 in accordance with a second embodiment of the present disclosure. FIG. 3 is a cross-sectional diagram of the touch panel 20 in accordance with the second embodiment of the present disclosure in FIG. 2 taken along a direction B-B. The touch panel 20 includes:

a substrate 21;

a plurality of touch electrodes, wherein the touch electrodes are disposed on the substrate 21, and the touch electrodes include a plurality of touch units 220; and at least one organic, transparent, electrically conductive layer 23 covering at least one surface of the touch units 220.

In the present embodiment, each of the touch units 220 is a self-capacitive touch electrode. The touch units 220 are arranged in an array on the substrate 21, to form a plurality of touch electrodes. Each of the touch units 220 has a square shape. In other embodiments, each of the touch units 220 may also have a rhombic shape, a rectangular shape, or another shape. A fabrication material of each of the touch units 220 is ITO, and may also be another brittle material or a material which may be easily broken after the material is bent a plurality of times, such as a metal material.

The at least one organic, transparent, electrically conductive layer 23 includes a patterned first organic, transparent, electrically conductive layer 231 and a patterned second organic, transparent, electrically conductive layer 232. The patterned first organic, transparent, electrically conductive layer 231 and the patterned second organic, transparent, electrically conductive layer 232 correspondingly cover two opposite surfaces of the square-shaped touch units 220. Both of the patterned first organic, transparent, electrically conductive layer 231 and patterned second organic, transparent, electrically conductive layer 232 have a same shape and a same size as the touch units 220. That is, the at least one organic, transparent, electrically conductive layer 23 exactly covers two opposite surfaces of the self-capacitive touch electrodes. It can be appreciated that, in other embodiments, as long as the patterned first organic, transparent, electrically conductive layer 231 covers a lower surface of the touch units 220, a size of the patterned first organic, transparent, electrically conductive layer 231 may also be larger than the size of the touch units 220. As long as the patterned second organic, transparent, electrically conductive layer 232 covers an upper surface of the touch units 220, a size of the patterned second organic, transparent, electrically conductive layer 232 may also be larger than the size of the touch units 220.

In the present embodiment, covering the two opposite surfaces of the touch units 220 with the at least one organic, transparent, electrically conductive layer 23 further increases flexibility of the touch electrodes formed by the touch units 220.

Figure 4:
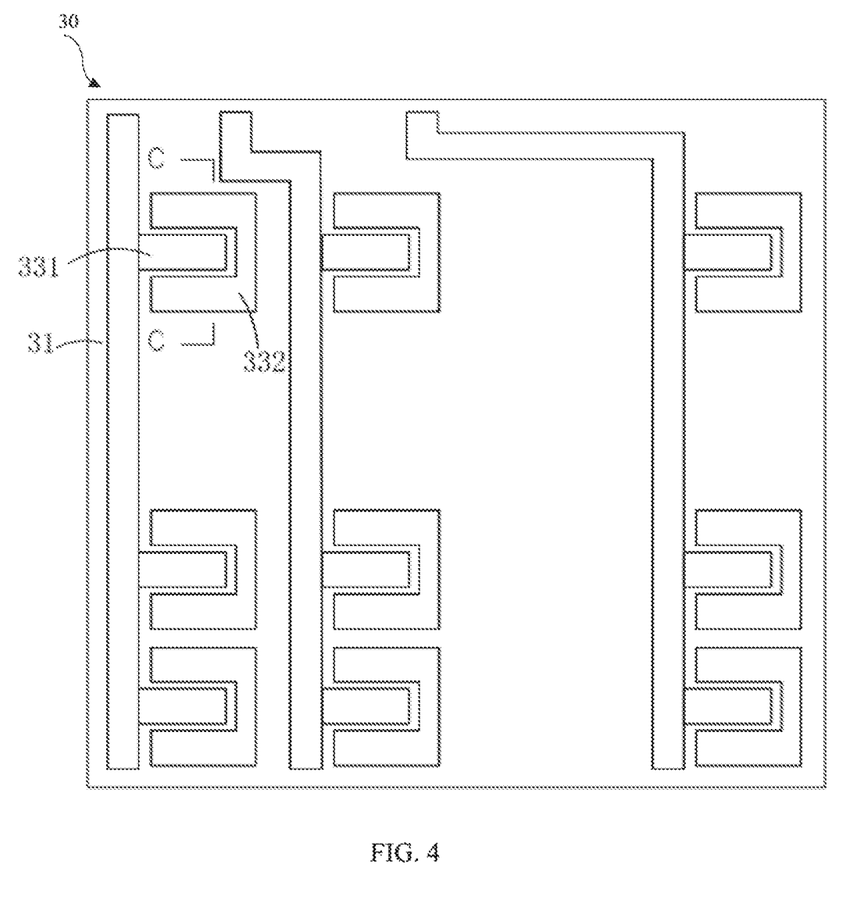
FIG. 4 is a top-view diagram of a touch panel in accordance with a third embodiment of the present disclosure.
Figure 5:
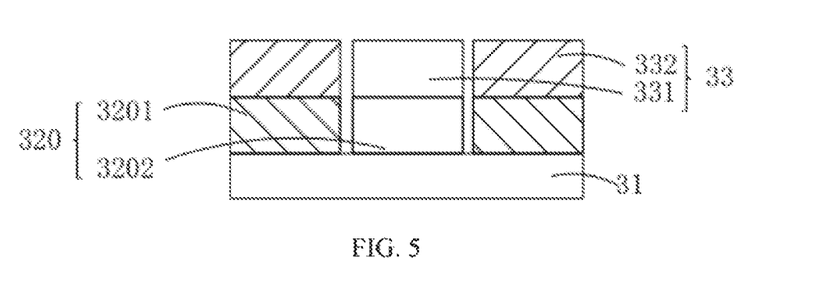
FIG. 5 is a cross-sectional diagram of the touch panel in accordance with the third embodiment of the present disclosure in FIG. 4 taken along a direction C-C.

Referring to FIGS. 4 and 5, FIG. 4 is a top-view diagram of a touch panel in accordance with a third embodiment of the present disclosure. FIG. 5 is a cross-sectional diagram of the touch panel in accordance with the third embodiment of the present disclosure in FIG. 4 taken along a direction C-C. The touch panel 30 includes:

a substrate 31;

a plurality of touch electrodes, wherein the touch electrodes are disposed on the substrate 31, the touch electrodes include a plurality of touch units 320, and each of the touch units 320 includes a receiving electrode 3201 and a transmitting electrode 3202; and A plurality of organic, transparent, electrically conductive layers 33, wherein the organic, transparent, electrically conductive layers 33 include at least one patterned first organic, transparent, electrically conductive layer 331 and at least one patterned second organic, transparent, electrically conductive layer 332. The at least one patterned first organic, transparent, electrically conductive layer 331 covers at least one surface of the transmitting electrode 3202. The at least one patterned second organic, transparent, electrically conductive layer 332 covers at least one surface of the receiving electrode 3201.

In the present embodiment, each of the touch units 320 is single-layer mutual-capacitive electrodes, and consists of the receiving electrode 3201 and the transmitting electrode 3202. The receiving electrode 3201 is an electrode with a strip-shaped main electrode and a plurality of strip-shaped branch electrodes extending from the strip-shaped main electrode. A plurality of strip-shaped main electrodes are arranged in an array along a horizontal direction. The transmitting electrode 3202 is a U-shaped electrode. A plurality of U-shaped electrodes are arranged in one-to-one correspondence with the strip-shaped branch electrodes of the receiving electrode 3201. The at least one patterned first organic, transparent, electrically conductive layer 331 covers one surface of the transmitting electrode 3202, and the two have exactly a same shape and a same size. The at least one patterned second organic, transparent, electrically conductive layer 332 covers one surface of the receiving electrode 3201, and the two have exactly a same shape and a same size. It can be appreciated that, in other embodiments, the organic, transparent, electrically conductive layers 33 may also correspondingly cover two opposite surfaces of the receiving electrode 3201, and two opposite surfaces of the transmitting electrode 3202. exactly a same shape and a same size. It can be appreciated that, in other embodiments, the organic, transparent, electrically conductive layers 33 may also correspondingly cover two opposite surfaces of the receiving electrode 3201, and two opposite surfaces of the transmitting electrode 3202.

The first embodiment, the second embodiment, and the third embodiment above correspondingly describe that each of the touch units is two-layer mutual-capacitive electrodes, a single-layer self-capacitive touch electrode, and single-layer mutual-capacitive electrodes. The at least one organic, transparent, electrically conductive layer covers the touch units. Therefore, the touch electrodes formed by the touch units have good electrical conductivity and flexibility, meeting flexibility requirements of the flexible screen for touch electrodes.

The description of the foregoing embodiments is only for facilitating understanding of the technical solutions of the present disclosure and the core ideas thereof. Persons of ordinary skill in the art should understand that the technical solution described in each of the foregoing embodiments may be modified, or at least one technical feature described in each of the foregoing embodiments may be replaced by at least one equivalent alternative. The modification or the at least one alternative should not cause the essence of the corresponding technical solution to depart from the scope of the technical solution of each embodiment of the present disclosure.

What is claimed is:

1. A touch panel, comprising:
a plurality of touch electrodes comprising a plurality of touch units;

wherein each of the touch units comprises at least one electrode, and each of the at least one electrode is a single-layer indium tin oxide (ITO) electrode; and at least one organic, transparent, electrically conductive layer;

wherein each of the at least one organic, transparent, electrically conductive layer covers a corresponding surface of the at least one electrode.

2. The touch panel of claim 1, wherein the at least one electrode are a transmitting electrode and a receiving electrode.

3. The touch panel of claim 2, wherein there are a plurality of the organic, transparent, electrically conductive layers; the organic, transparent, electrically conductive layers comprise at least one first organic, transparent, electrically conductive layer and at least one second organic, transparent, electrically conductive layer; and the at least one first organic, transparent, electrically conductive layer covers at least one surface of the transmitting electrode, and the at least one second organic, transparent, electrically conductive layer covers at least one surface of the receiving electrode.

4. The touch panel of claim 3, wherein there is only one of the first organic, transparent, electrically conductive layer, there is only one of the surface of the transmitting electrode, there is only one of the second organic, transparent, electrically conductive layer, and there is only one of the surface of the second organic, transparent, electrically conductive layer; the first organic, transparent, electrically conductive layer covers the surface of the transmitting electrode; and the second organic, transparent, electrically conductive layer covers the surface of the receiving electrode.

5. The touch panel of claim 1, wherein each of the touch units is a self-capacitive touch electrode.

6. The touch panel of claim 5, wherein there are a plurality of the organic, transparent, electrically conductive layers; and the organic, transparent, electrically conductive layers correspondingly cover two opposite surfaces of the self-capacitive touch electrode.

7. The touch panel of claim 1, wherein each of the at least one organic, transparent, electrically conductive layer has a thickness of 0.1 µm to 2 µm.

8. The touch panel of claim 1, wherein a fabrication material of each of the touch units is ITO.

9. The touch panel of claim 1, wherein each of the at least one organic, transparent, electrically conductive layer is an organic, transparent, electrically conductive adhesive.

10. A fabrication method of a touch panel, comprising:
providing a substrate;
disposing a plurality of touch units on the substrate;
wherein each of the touch units comprises at least one electrode, and each of the at least one electrode is a single-layer indium tin oxide (ITO) electrode; and
covering a corresponding surface of the at least one electrode with each of at least one organic, transparent, electrically conductive layer.

11. The fabrication method of the touch panel of claim 10, wherein each of the touch units is any of two-layer mutual-capacitive electrodes, a single-layer self-capacitive touch electrode, and single-layer mutual-capacitive electrodes.

12. The fabrication method of the touch panel of claim 10, wherein a fabrication material of each of the touch units is ITO.

13. The fabrication method of the touch panel of claim 10, wherein each of the at least one organic, transparent, electrically conductive layer has a thickness of 0.1 µm to 2 µm.

14. The fabrication method of the touch panel of claim 10, wherein each of the at least one organic, transparent, electrically conductive layer is an organic, transparent, electrically conductive adhesive.

15. The fabrication method of the touch panel of claim 10, wherein the substrate is a rigid substrate or a flexible substrate.

16. The fabrication method of the touch panel of claim 15, wherein the flexible substrate is any of a polyimide (PI) substrate, a cycloolefin polymer (COP) substrate, a polyethylene terephthalate (PET) substrate, and a flexible organic light-emitting diode (OLED) display.

17. The fabrication method of the touch panel of claim 15, wherein the rigid substrate is any of a glass substrate, a thin film transistor array substrate, a liquid crystal panel, and a rigid OLED display.

* * * * *